(12) United States Patent
Morito

(10) Patent No.: US 11,503,172 B2
(45) Date of Patent: Nov. 15, 2022

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Kazuaki Morito, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/176,246

(22) Filed: Feb. 16, 2021

(65) Prior Publication Data

US 2022/0038590 A1 Feb. 3, 2022

(30) Foreign Application Priority Data

Jul. 28, 2020 (JP) .............................. JP2020-127640

(51) Int. Cl.
 *H04N 1/00* (2006.01)
 *H04N 1/44* (2006.01)
 *H04N 1/12* (2006.01)

(52) U.S. Cl.
 CPC ..... *H04N 1/00514* (2013.01); *H04N 1/00474* (2013.01); *H04N 1/00244* (2013.01); *H04N 1/00482* (2013.01); *H04N 1/12* (2013.01); *H04N 1/4426* (2013.01)

(58) Field of Classification Search
 CPC .......... H04N 1/00514; H04N 1/00474; H04N 1/00244; H04N 1/00482; H04N 1/4426; H04N 1/12
 USPC ........................................................ 358/1.14
 See application file for complete search history.

(56) References Cited

U.S. PATENT DOCUMENTS

| | | | |
|---|---|---|---|
| 10,268,757 B2* | 4/2019 | Aikawa | H04L 51/04 |
| 2012/0050806 A1* | 3/2012 | Fukuda | H04N 1/32101 |
| | | | 358/1.15 |
| 2020/0371732 A1* | 11/2020 | Kondo | G06F 3/1222 |

FOREIGN PATENT DOCUMENTS

JP 2016-174374 A 9/2016

* cited by examiner

*Primary Examiner* — Darryl V Dottin
(74) *Attorney, Agent, or Firm* — Oliff PLC

(57) ABSTRACT

An information processing apparatus includes a processor configured to manage pieces of screen information in association with users, the screen information being related to an operation screen to be used for operating an image processing apparatus, identify a user who is going to use the image processing apparatus, and cause a display to display an operation screen created based on the screen information of the identified user, the display being used by the user when using the image processing apparatus.

13 Claims, 15 Drawing Sheets

FIG. 5

| MANAGEMENT NUMBER | USER ID | USER NAME | PASSWORD | APPARATUS INFORMATION | OPERATION SCREEN INFORMATION |
|---|---|---|---|---|---|
| 001 | AAA | AXX XXX | YYYY | MFP01234 | UI-mfp01234 |
| 002 | BBB | BXX XXX | YYYY | CP45678 | UI-cp45678 |
| 003 | CCC | CXX XXX | YYYY | MFP56789 | UI-mfp56789 |
| ... | ... | ... | ... | ... | ... |

300

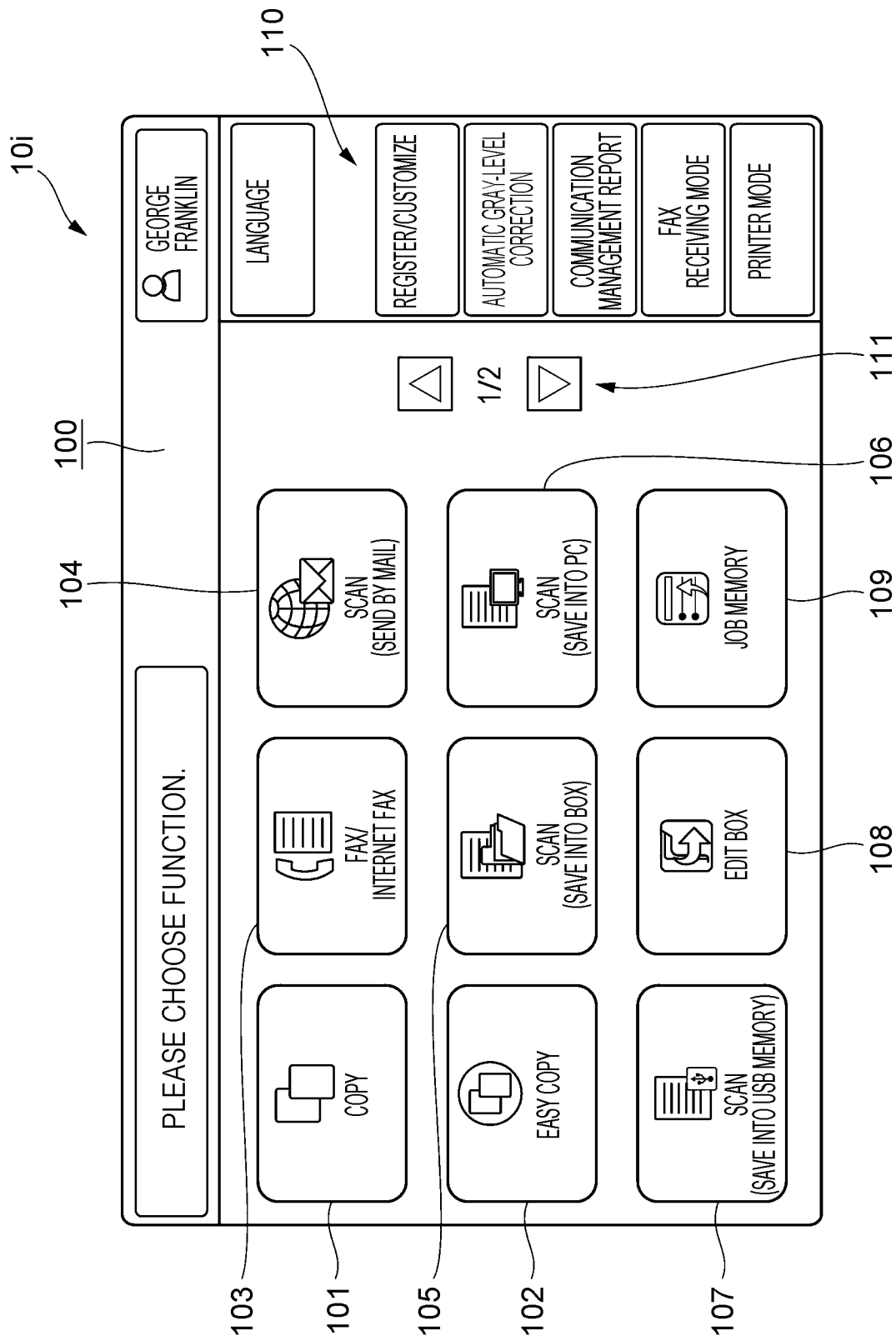

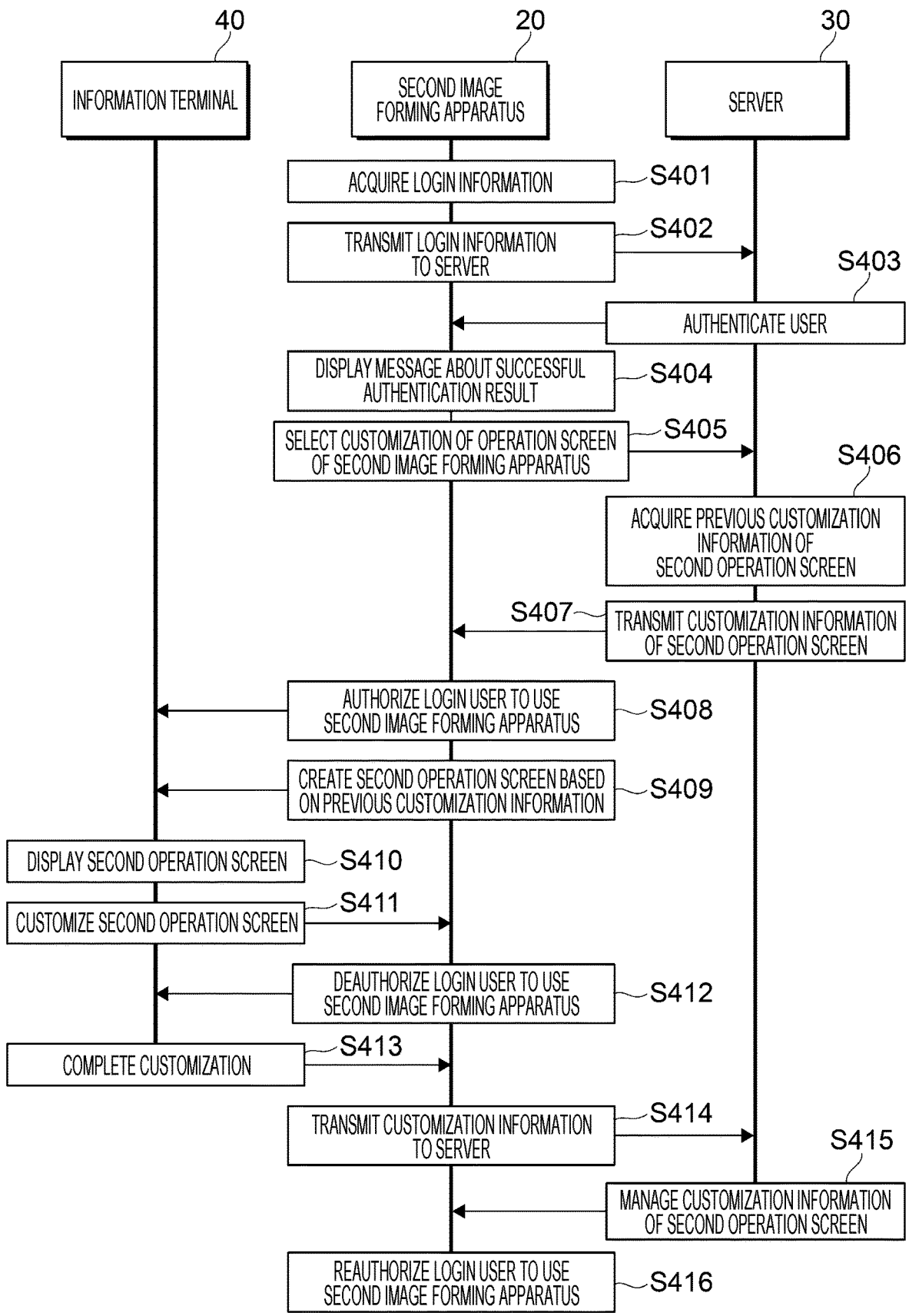

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-127640 filed Jul. 28, 2020.

BACKGROUND

(i) Technical Field

The present disclosure relates to an information processing apparatus and a non-transitory computer readable medium storing a program.

(ii) Related Art

For example, Japanese Unexamined Patent Application Publication No. 2016-174374 describes an image forming apparatus including a closeness notifier, a communicator, a display, and an image formation controller. In response to detection of closeness of a portable information terminal in which data indicating correlations among screen elements constituting a template of an operation screen, positions of the screen elements, and setting items of the screen elements is prestored in a storage as UI information, the closeness notifier notifies the portable information terminal about the closeness. The communicator receives the UI information from the portable information terminal. The display displays an operation screen based on the received UI information. The image formation controller receives an operation on the displayed operation screen by an operator and controls the image forming apparatus to perform an image forming process in response to the received operation. In response to the closeness of the portable information terminal that stores the UI information, the image formation controller receives user's choice as to whether to use an operation screen created based on the UI information or an operation screen prestored in the image forming apparatus.

SUMMARY

Aspects of non-limiting embodiments of the present disclosure relate to the following circumstances. For example, a user of a first image processing apparatus may use a second image processing apparatus different from the first image processing apparatus. In this case, the user may find inconvenience to a difference between an operation screen for use in the first image processing apparatus and an operation screen for use in the second image processing apparatus.

It is therefore appropriate that a user who is going to use a plurality of different image processing apparatuses may easily use operation screens of the respective image processing apparatuses compared with a case where different operation screens are displayed depending on the image processing apparatuses.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus comprising a processor configured to manage pieces of screen information in association with users, the screen information being related to an operation screen to be used for operating an image processing apparatus, identify a user who is going to use the image processing apparatus, and cause a display to display an operation screen created based on the screen information of the identified user, the display being used by the user when using the image processing apparatus.

BRIEF DESCRIPTION OF THE DRAWINGS

Exemplary embodiments of the present disclosure will be described in detail based on the following figures, wherein:

FIG. 5 illustrates an example of a user management table of the first exemplary embodiment;

FIGS. 6A and 6B illustrate a first example of a second operation screen of the first exemplary embodiment;

FIG. 14 illustrates operations for customizing the second operation screen of a second image forming apparatus according to the third exemplary embodiment.

DETAILED DESCRIPTION

Exemplary embodiments are described below in detail with reference to the accompanying drawings.

<Overall Configuration of Information Processing System 1>

Figure 1:
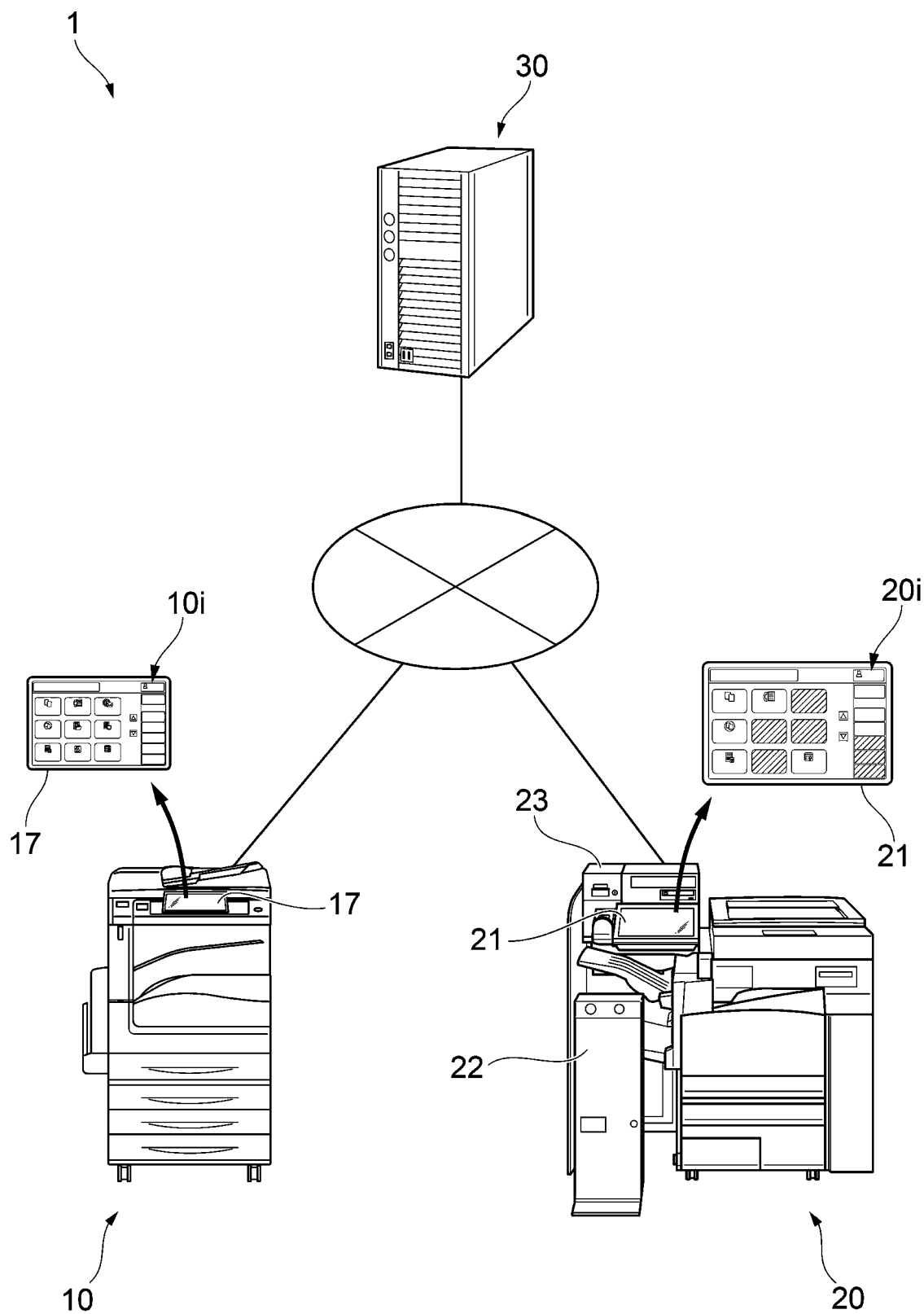
FIG. 1 illustrates an example of the configuration of an information processing system according to a first exemplary embodiment.

FIG. 1 illustrates an example of the configuration of an information processing system 1 according to a first exemplary embodiment.

The information processing system 1 illustrated in FIG. 1 includes a first image forming apparatus 10 that forms images, a second image forming apparatus 20 that forms images and differs from the first image forming apparatus 10, and a server 30 that provides predetermined services for the first image forming apparatus 10 and the second image forming apparatus 20.

In the first exemplary embodiment, the server 30 is an example of an information processing apparatus, the second image forming apparatus 20 is an example of an image processing apparatus, and the first image forming apparatus 10 is an example of a specific image processing apparatus.

The first image forming apparatus 10, the second image forming apparatus 20, and the server 30 are connected to a network. The network of the first exemplary embodiment is a communication network for use in data communications among the apparatuses of the information processing system 1. The type of the network is not particularly limited as long as data is exchangeable. Examples of the network include the Internet, a local area network (LAN), and a wide area network (WAN). The communication line for use in the data communications may be wired or wireless. The apparatuses may be connected via a plurality of networks or communication lines.

In the example illustrated in FIG. 1, two image forming apparatuses, that is, the first image forming apparatus 10 and the second image forming apparatus 20 are used but the number of image forming apparatuses is not limited. Three or more image forming apparatuses may be connected to the network.

In this exemplary embodiment, the first image forming apparatus 10 is installed in, for example, a workplace of a certain user. The second image forming apparatus 20 is installed in, for example, a convenience store or other shops near a house of the user and is used when the user works at home. The user uses the first image forming apparatus 10 more frequently than the second image forming apparatus 20 and is therefore more familiar with the first image forming apparatus 10 than the second image forming apparatus 20.

The first image forming apparatus 10 has a first display 17 described later. The first display 17 displays a first operation screen 10i to be used by the user to operate the first image forming apparatus 10. The second image forming apparatus 20 has a second display 21 described later. The second display 21 displays a second operation screen 20i to be used by the user to operate the second image forming apparatus 20.

In the first exemplary embodiment, the first image forming apparatus 10 and the second image forming apparatus 20 are different models. The first operation screen 10i of the first image forming apparatus 10 and the second operation screen 20i of the second image forming apparatus 20 have different formats based on their models in a case where an operation screen service of this exemplary embodiment described later is not used. Specifically, in the case where the operation screen service is not used, the first operation screen 10i and the second operation screen 20i are independent of each other without being associated with each other.

In the information processing system 1 of the first exemplary embodiment, the server 30 manages screen information related to the first operation screen 10i of the first image forming apparatus 10 that the user is familiar with. In the information processing system 1, the user who is going to use, for example, the second image forming apparatus 20 is identified and the second display 21 of the second image forming apparatus 20 displays a second operation screen 20i created based on the information on the first operation screen 10i.

A configuration that implements the operation screen service is described below in detail.

In the following description, the first image forming apparatus 10 and the second image forming apparatus 20 are collectively referred to as "image forming apparatuses" unless otherwise distinguished. Similarly, the first display 17 and the second display 21 are collectively referred to as "displays" unless otherwise distinguished. The first operation screen 10i and the second operation screen 20i are collectively referred to as "operation screens" unless otherwise distinguished.

[First Image Forming Apparatus 10]

Figure 2:
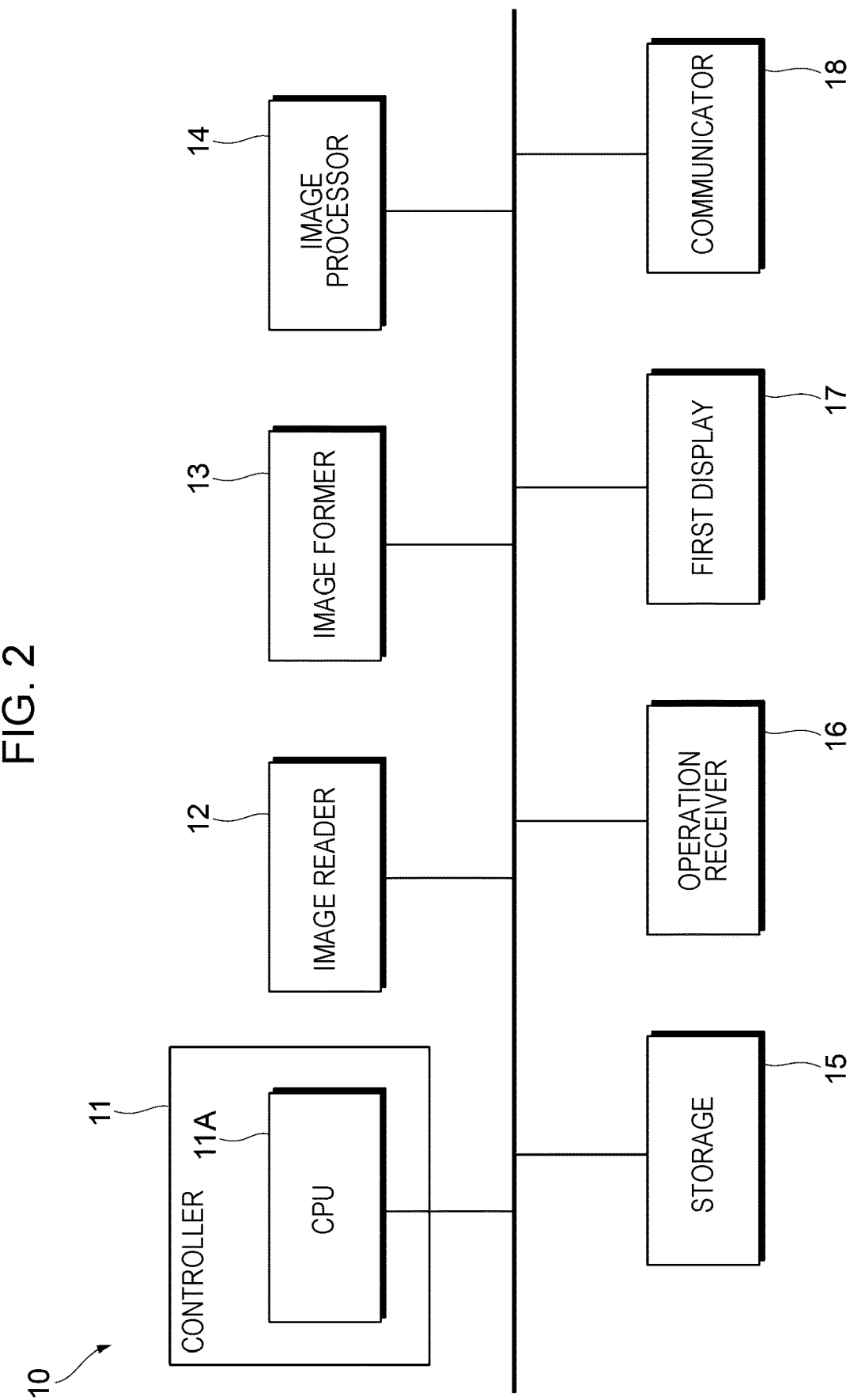
FIG. 2 illustrates an example of the configuration of a first image forming apparatus of the first exemplary embodiment.

FIG. 2 illustrates an example of the configuration of the first image forming apparatus 10 of the first exemplary embodiment.

As illustrated in FIG. 2, the first image forming apparatus 10 includes a controller 11 that controls overall operations of the apparatus, an image reader 12 that reads document images, and an image former 13 that forms images on paper. The first image forming apparatus 10 further includes an image processor 14 that performs color correction, gray-level correction, or other processes on image data, a storage 15 that stores image data and other data, and an operation receiver 16 that receives user's operations. The first image forming apparatus 10 further includes the first display 17 to be used for displaying a user interface screen or other screens, and a communicator 18 that performs communications via a telephone line, a local area network (LAN) cable, or the like. The controller 11 and the other components are connected together via a signal line or a bus.

The controller 11 includes a central processing unit (CPU) 11A that is an example of a processor, a read only memory (ROM) that stores firmware, a basic input/output system (BIOS), and the like, and a random access memory (RAM) to be used as a working area. The controller 11 functions as a so-called computer.

The image reader 12 is a so-called scanner. The image reader 12 supports a mode in which an image is read from a stationary document, and a mode in which an image is read from a transported document.

The image former 13 forms an image on a recording medium such as paper. The image former 13 has an image forming mechanism depending on its system. The image former 13 uses, for example, toner or ink as a recording agent.

The image processor 14 has a dedicated processor or a processing circuit that processes image data.

Examples of the storage 15 include a hard disk drive (HDD) and a semiconductor memory. The storage 15 stores read image data obtained by the image reader 12 and document data or image data received through communications with external apparatuses.

Examples of the operation receiver 16 include buttons, switches, and a film-shaped touch sensor on the surface of the first display 17.

Examples of the first display 17 include a liquid crystal display and an organic electroluminescence (EL) display.

The communicator 18 has communication interfaces conforming to various standards.

[Second Image Forming Apparatus 20]

The configuration of the second image forming apparatus 20 is basically similar to that of the first image forming apparatus 10. The second image forming apparatus 20 has components similar to the controller 11, the image reader 12, the image former 13, the image processor 14, the storage 15, the operation receiver 16, and the communicator 18 of the first image forming apparatus 10. In the first exemplary embodiment, a component of the second image forming apparatus 20 that corresponds to the first display 17 of the first image forming apparatus 10 is referred to as "second display 21" (see FIG. 1).

As illustrated in FIG. 1, the second image forming apparatus 20 further includes a money receiver 22 that receives money, and a data reading/writing device 23 that reads and writes data in the second image forming apparatus 20.

The money receiver 22 receives money inserted by a user, and returns money as necessary. The money is not limited to cash, but may be electronic money using an integrated circuit (IC) card or a prepaid card in place of cash.

The data reading/writing device 23 reads data from a portable storage medium such as an SD memory card, a universal serial bus (USB) memory, or a compact disc (CD), and writes data into the portable storage medium.

In the information processing system 1 of the first exemplary embodiment, the basic configurations of the first image forming apparatus 10 and the second image forming apparatus 20 are similar to each other as described above. However, the first image forming apparatus 10 and the second image forming apparatus 20 have functional differences depending on their hardware and software.

Examples of the functional difference depending on hardware include the presence or absence of a stapling function for binding, with staples, a book that is a bundle of printed paper, the presence or absence of a sorting function for sorting sheets of printed paper into a plurality of different receiving trays, a difference in a function related to printable paper sizes, and the presence or absence of the money receiver 22 and the data reading/writing device 23.

The functional difference depending on software may be caused by, for example, installation places or usages of the image forming apparatuses. For example, a plurality of personal computers (PCs) are connected to the first image forming apparatus 10 installed in the workplace. The second image forming apparatus 20 is installed in the shop under the assumption that no PC is connected. In this case, the functional difference depending on software is the presence or absence of a function under the assumption that a PC is connected. Examples of the functional difference depending on software include the presence or absence of a function of saving read scan data into each PC. Unlike the first image forming apparatus 10, the second image forming apparatus 20 installed in the shop does not store, for example, read scan data in the storage to save the data for a predetermined period. Examples of the functional difference depending on software in this case include the presence or absence of a function of storing data in the storage of the apparatus to save the data for a predetermined period.

[Server 30]

Figure 3:
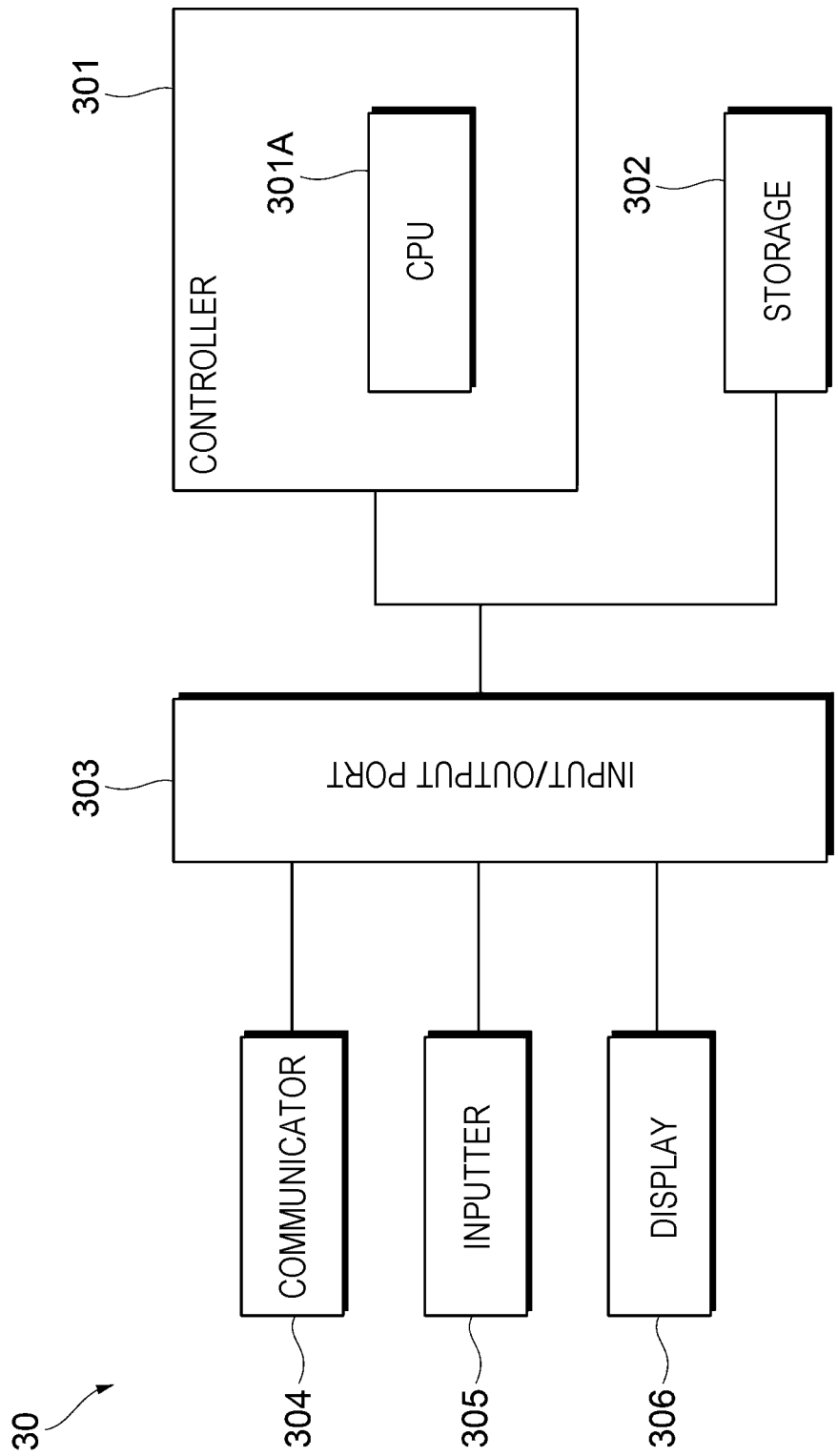
FIG. 3 illustrates an example of the configuration of a server of the first exemplary embodiment.

FIG. 3 illustrates an example of the configuration of the server 30 of the first exemplary embodiment.

As illustrated in FIG. 3, the server 30 includes a controller 301 that controls overall operations of the server 30, a storage 302 that stores various types of data, an input/output port 303, a communicator 304, an inputter 305, and a display 306.

The controller 301 includes a CPU 301A that is an example of a processor, a ROM that stores a BIOS and the like, and a RAM to be used as a working area. The controller 301 functions as a so-called computer.

Examples of the storage 302 include a hard disk drive and a semiconductor memory. The storage 302 stores not only management data but also an operating system and other programs.

Examples of the inputter 305 include a keyboard and a mouse, which are provided outside the server 30 as necessary.

Examples of the display 306 include a liquid crystal display and an organic electroluminescence (EL) display, which are provided outside the server 30 as necessary.

Next, detailed description is made about a functional configuration implemented by the server 30 to display the second operation screen 20i on the second display 21 of the second image forming apparatus 20.

Figure 4:
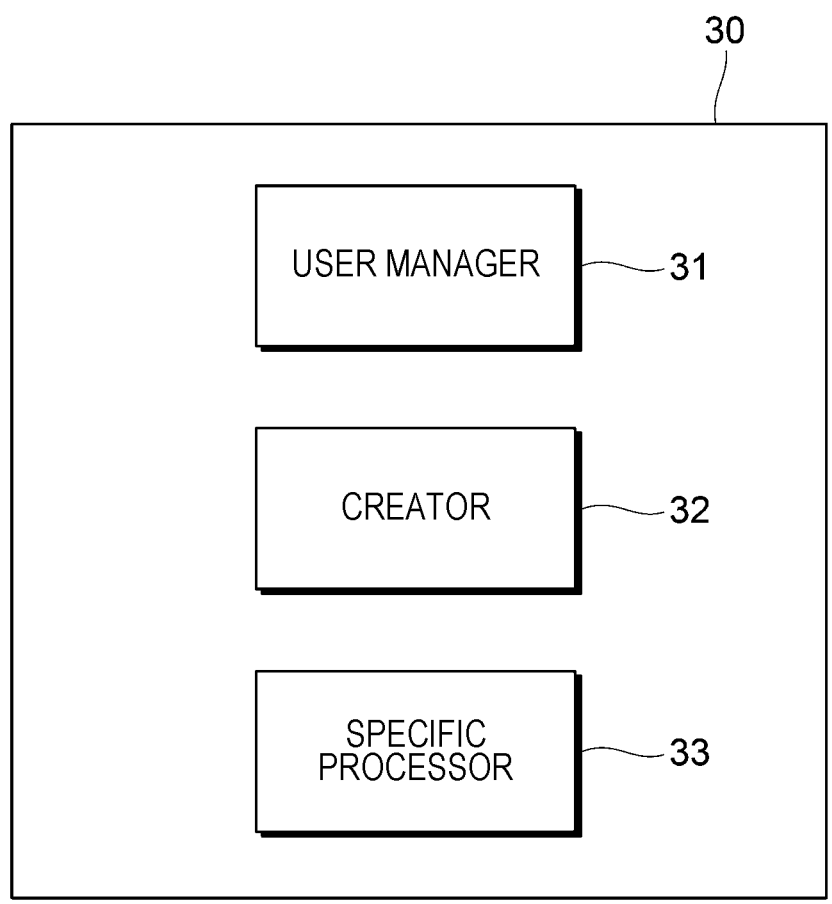
FIG. 4 is a functional block diagram of the server of the first exemplary embodiment.

FIG. 4 is a functional block diagram of the server 30 of the first exemplary embodiment.

FIG. 5 illustrates an example of a user management table 300 of the first exemplary embodiment.

As illustrated in FIG. 4, the server 30 includes a user manager 31 that manages information related to users, a creator 32 that creates an operation screen, and a specific processor 33 that performs a specific process as a substitute for the second image forming apparatus 20. The user manager 31, the creator 32, and the specific processor 33 are implemented by the controller 301, the storage 302, and the communicator 304 (see FIG. 3).

(User Manager 31)

The user manager 31 manages users of the system and pieces of screen information associated with the users by using the user management table 300. The user management table 300 includes fields for management number, user ID, user name, password, apparatus information, and operation screen information.

The user ID and the password are so-called login information. For example, the user ID and the password are used by a user to log into the first image forming apparatus 10 and the second image forming apparatus 20.

The user name is information on a specific name of the user.

The apparatus information is model information of an image forming apparatus that the user is familiar with. Examples of the familiar image forming apparatus include an image forming apparatus used by the user in the past.

The familiar image forming apparatus may be determined as being familiar to the user on an objective standpoint. For example, the familiar image forming apparatus is an apparatus that has been used most frequently in a predetermined period from a certain time point. The familiar image forming apparatus may also be a specified image forming apparatus determined as being familiar to the user on a subjective standpoint by, for example, the user himself/herself or a company to which the user belongs.

In the first exemplary embodiment, the user is familiar with the first image forming apparatus 10 installed in the workplace. In this case, the apparatus information is model information for identifying the first image forming apparatus 10.

The operation screen information is related to an operation screen to be displayed on a display of the image forming apparatus registered in the field for apparatus information. That is, the operation screen information is used in the image forming apparatus that the user is familiar with.

In the first exemplary embodiment, the first image forming apparatus 10 is registered in the field for apparatus information as described above. Therefore, the operation screen information is related to the first operation screen 10i on the first display 17 of the first image forming apparatus 10. The first operation screen 10i is created in association with functions executable by the first image forming apparatus 10.

(Creator 32)

The creator 32 identifies a user who is going to use the second image forming apparatus 20. The creator 32 receives information on this user from the second image forming apparatus 20. The user is identified based on user's login to the second image forming apparatus 20 (the identified user is hereinafter referred to as "login user"). For example, the user logs into the second image forming apparatus 20 by selecting his/her user name from among a plurality of user names listed on the second display 21 or by inputting a user ID. If the second image forming apparatus 20 has a card reader, the user logs into the second image forming apparatus 20 by passing an ID card for uniquely identifying the user over the card reader.

The creator 32 acquires operation screen information of the identified user. Specifically, the creator 32 acquires the operation screen information of the user by referring to the user management table 300.

The creator 32 acquires information related to the functional configuration of hardware of the second image forming apparatus 20 and the functional configuration of image processing software of the second image forming apparatus 20 (hereinafter referred to as "functional configuration information"). The functional configuration information is an example of functional information. In the first exemplary embodiment, the creator 32 acquires the functional configuration information of the second image forming apparatus 20 from the second image forming apparatus 20 when receiving information on the login user.

The creator 32 may create in advance a database for managing pieces of functional configuration information of a plurality of models including the second image forming apparatus 20 of the first exemplary embodiment, determine model information of the image forming apparatus to be used by the login user, and acquire functional configuration information associated with the determined model information from the database.

The creator 32 creates an operation screen of the image forming apparatus to be used by the login user by using operation screen information of the login user and the functional configuration information of the image forming apparatus. That is, the creator 32 creates a second operation screen 20i to be displayed on the second display 21 of the second image forming apparatus 20 based on the operation screen information of the first operation screen 10i of the first image forming apparatus 10 that the login user is familiar with, and the functional configuration information of the second image forming apparatus 20 to be actually used by the login user.

The creator 32 basically creates the second operation screen 20i of the second image forming apparatus 20 based on the first operation screen 10i of the first image forming apparatus 10 that is identified based on the operation screen information. For example, the format of the first operation screen 10i and the format of the second operation screen 20i are unified based on the first operation screen 10i. For example, the creator 32 matches a screen design related to text fonts, positions of button images, and colors of the button images and a background image on the second operation screen 20i with a screen design on the first operation screen 10i. For example, the creator 32 matches page transition and images to be displayed in response to operation on the second operation screen 20i with page transition and displayed images on the first operation screen 10i.

On the second operation screen 20i created based on the first operation screen 10i, the creator 32 displays functions inexecutable by the second image forming apparatus 20 in a format different from the format on the first operation screen 10i to be displayed on the first display 17 of the first image forming apparatus 10. The creator 32 compares the model information of the first image forming apparatus 10 and the model information of the second image forming apparatus 20 to extract functions executable by both the image forming apparatuses and functions executable only by one of the image forming apparatuses. For example, the creator 32 displays the functions inexecutable by the second image forming apparatus 20 on the second operation screen 20i while indicating that the functions are not operable or selectable. For example, the creator 32 displays the functions inexecutable by the second image forming apparatus 20 on the second operation screen 20i by varying the format from that of the executable functions or displaying texts or superposing graphical objects meaning that the functions are not available.

The creator 32 may hide the functions inexecutable by the second image forming apparatus 20 on the second operation screen 20i created based on the first operation screen 10i.

Next, the second operation screen 20i is described in detail with reference to the drawings.

Figure 6B:
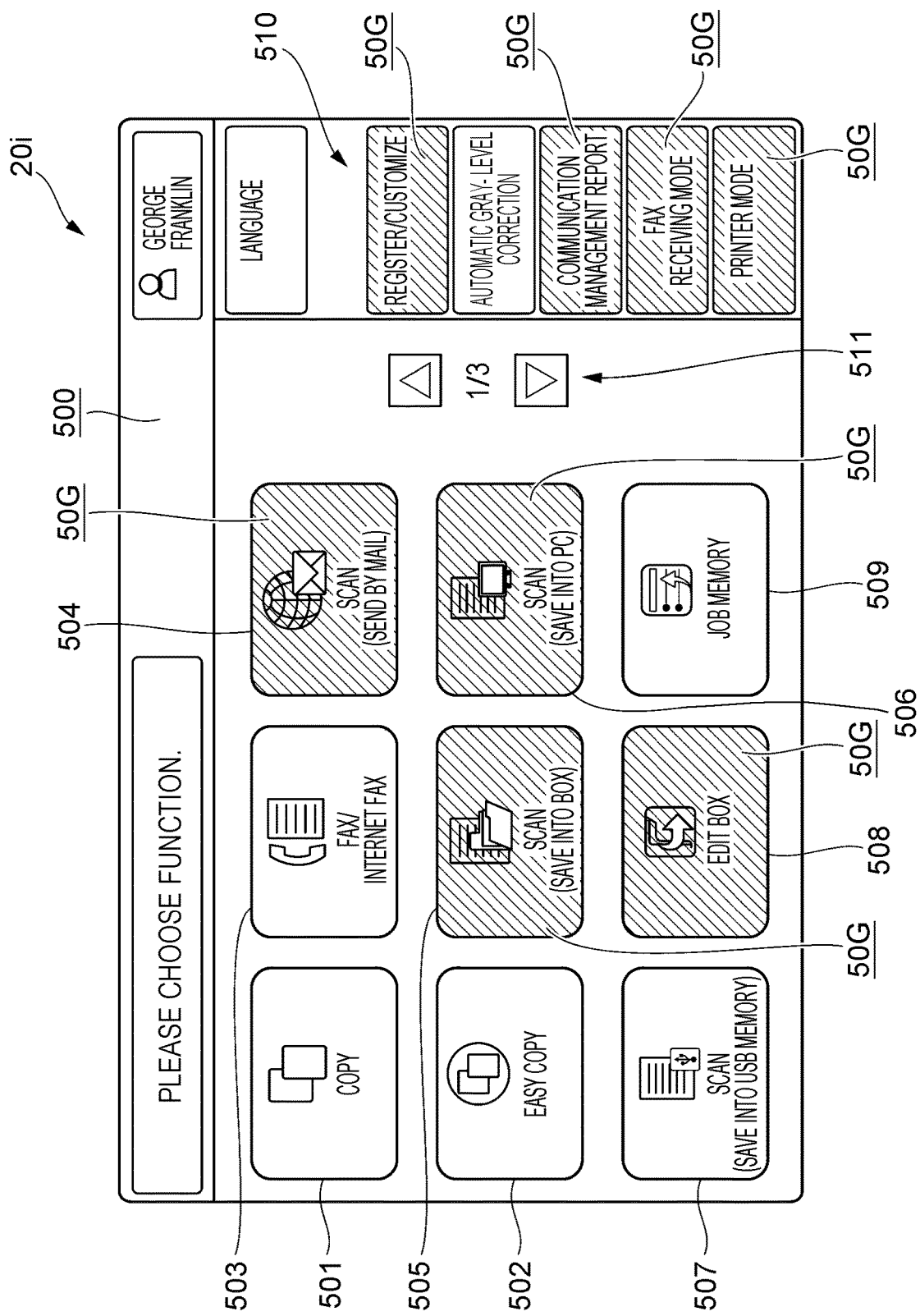

FIGS. 6A and 6B illustrate a first example of the second operation screen 20i of the first exemplary embodiment.

FIG. 6A illustrates the first operation screen 10i. FIG. 6B illustrates the second operation screen 20i.

Figure 7:
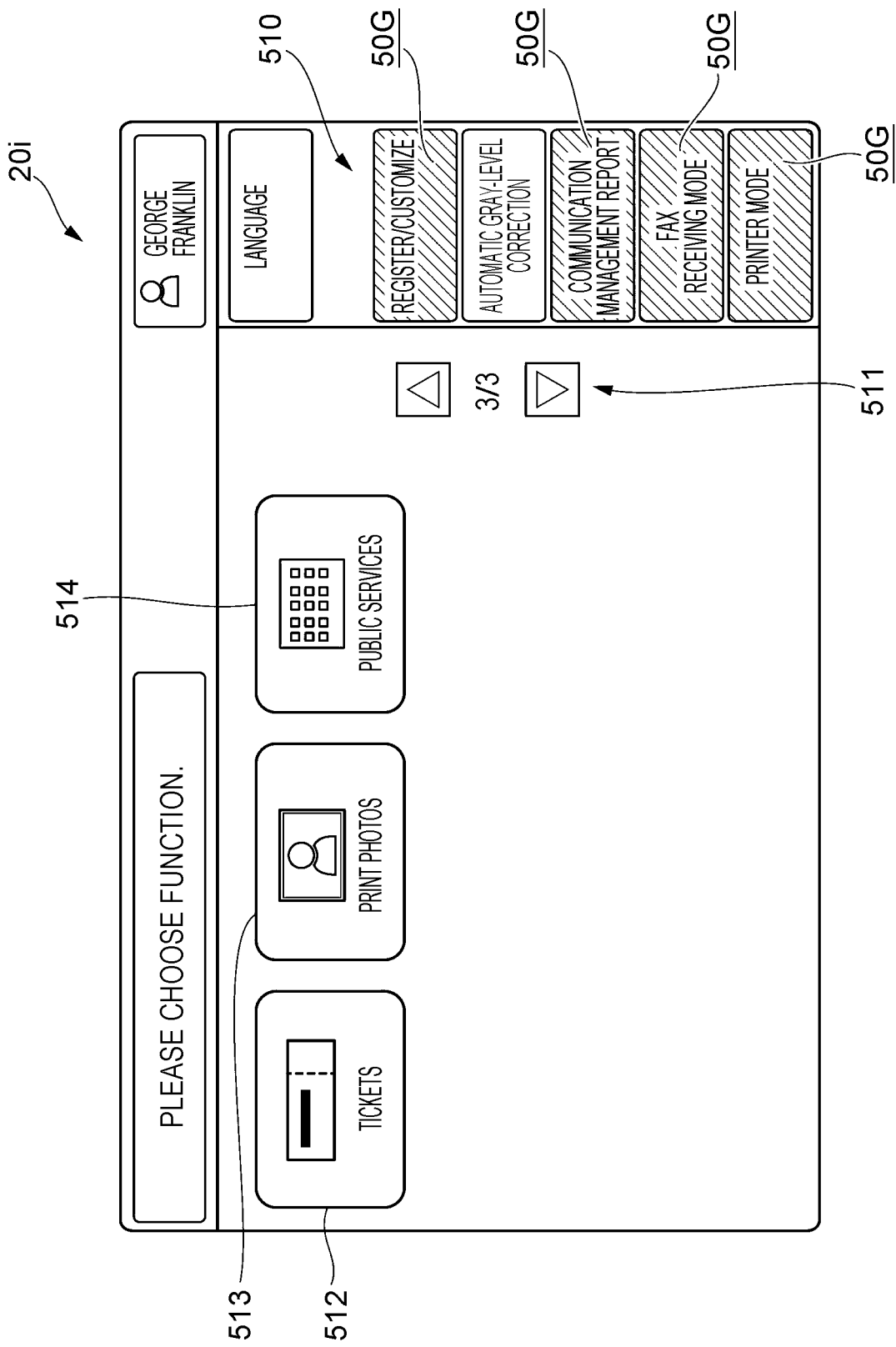
FIG. 7 illustrates a second example of the second operation screen of the first exemplary embodiment.

FIG. 7 illustrates a second example of the second operation screen 20i of the first exemplary embodiment.

As illustrated in FIG. 6A, the first operation screen 10i shows various images constituting the operation screen. Specifically, the first operation screen 10i shows a background image 100, a "copy" button 101 for detailed setting of copying, an "easy copy" button 102 for simple setting of copying, and a "facsimile" button 103 for setting of facsimile. The first operation screen 10i also shows a "scan (send by mail)" button 104 for sending document scan data by mail, a "scan (save into box)" button 105 for storing scan data in the storage 15 of the image forming apparatus, a "scan (save into PC)" button 106 for saving scan data into a PC connected to the image forming apparatus, and a "scan (save into memory)" button 107 for storing scan data in a portable recording medium. The first operation screen 10i also shows an "edit box" button 108 for editing data stored in the storage 15 of the image forming apparatus, a "job memory" button 109 for performing an operation under a prestored procedure, and setting buttons 110 for various settings on the image forming apparatus. The first operation screen 10i also shows page transition images 111 for transition of screen pages. Those images are displayed on the first operation screen 10i in association with the functions executable by the first image forming apparatus 10.

As illustrated in FIG. 6B, the creator 32 creates a second operation screen 20i based on the first operation screen 10i. The second operation screen 20i shows a background image 500, a "copy" button 501, an "easy copy" button 502, and a "facsimile" button 503. The second operation screen 20i also shows a "scan (send by mail)" button 504, a "scan (save into box)" button 505, a "scan (save into PC)" button 506, and a "scan (save into memory)" button 507. The second operation screen 20i also shows an "edit box" button 508, a "job memory" button 509, setting buttons 510, and page transition images 511. Those images are displayed on the second operation screen 20i in association with the functions executable by the first image forming apparatus 10. Shapes, positions, and colors of various button images, graphical objects such as pictures, and text fonts on the second operation screen 20i correspond to those on the first operation screen 10i.

The second image forming apparatus 20 does not store data in the storage 15 to save the data for a predetermined period. Further, the second image forming apparatus 20 does not send mails and is not connected to PCs. Therefore, the "scan (send by mail)" button 504, the "scan (save into box)" button 505, the "scan (save into PC)" button 506, and the "edit box" button 508 on the second operation screen 20i are displayed in grayout 50G to indicate that those buttons are not operable or selectable by the login user.

On the second operation screen 20i, buttons of functions that are executable by the second image forming apparatus 20 but may be used by the login user at a very low frequency are also displayed in grayout 50G. For example, the creator 32 displays, in grayout 50G, several setting buttons 510 that are not possibly used by the login user.

In the first exemplary embodiment, the creator 32 displays, on the second operation screen 20i, images of functions inexecutable by the first image forming apparatus 10 but executable by the second image forming apparatus 20 (hereinafter referred to as "special functions"). In this case, the creator 32 displays the images of the special functions by using shapes, colors, and text fonts similar to those for other images.

As illustrated in FIG. 7, the second operation screen 20i shows various images constituting the operation screen. The second operation screen 20i shows a "tickets" button 512 for instruction to execute a function of printing tickets for sports or concerts, a "print photos" button 513 for instruction to execute a function of printing photos, and a "public services" button 514 for instruction to execute a function of printing certificates related to public administration, such as a resident card. Those button images are examples of the special functions.

The creator 32 displays the button images associated with the special functions on the second operation screen 20i of the second display 21 in the format on the first operation screen 10i of the first image forming apparatus 10. The button images are displayed on a different screen page that is not provided in the first operation screen 10i.

For example, the creator 32 creates the second operation screen 20i by arranging the button images of the special functions at positions different from those of various images on the first operation screen 10i instead of replacing the button images of the functions inexecutable by the second image forming apparatus 20. The creator 32 keeps the positions of the button images on the first operation screen 10i that the user is familiar with.

Figure 8A:
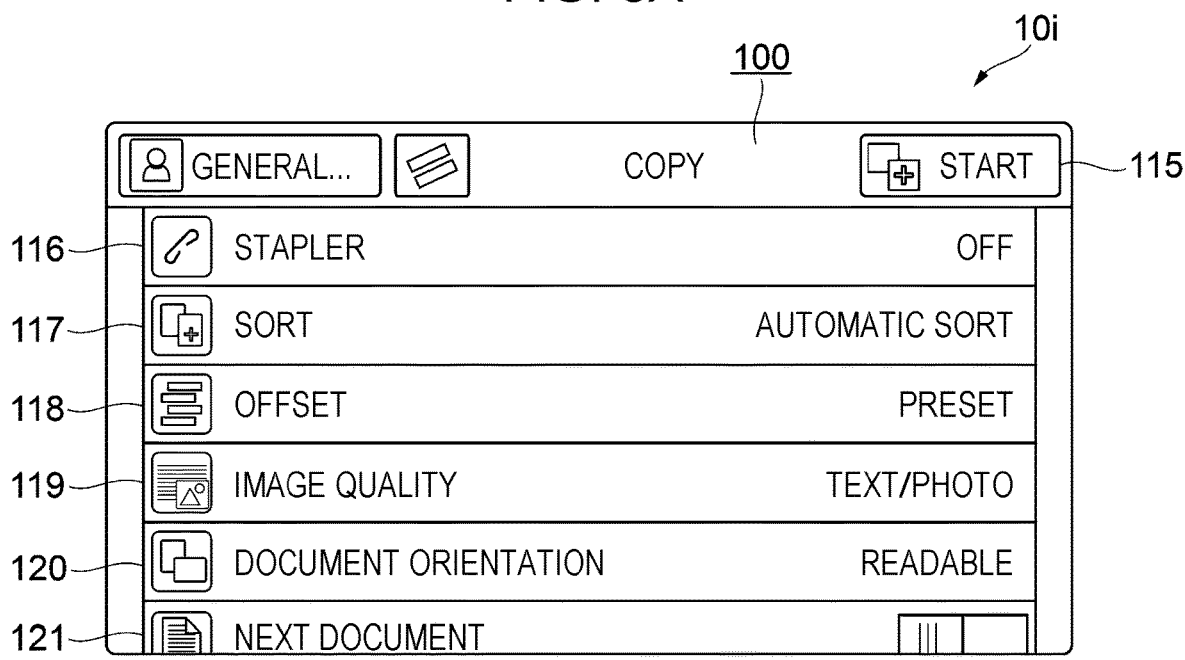
FIGS. 8A and 8B illustrate a third example of the second operation screen of the first exemplary embodiment.
Figure 8B:
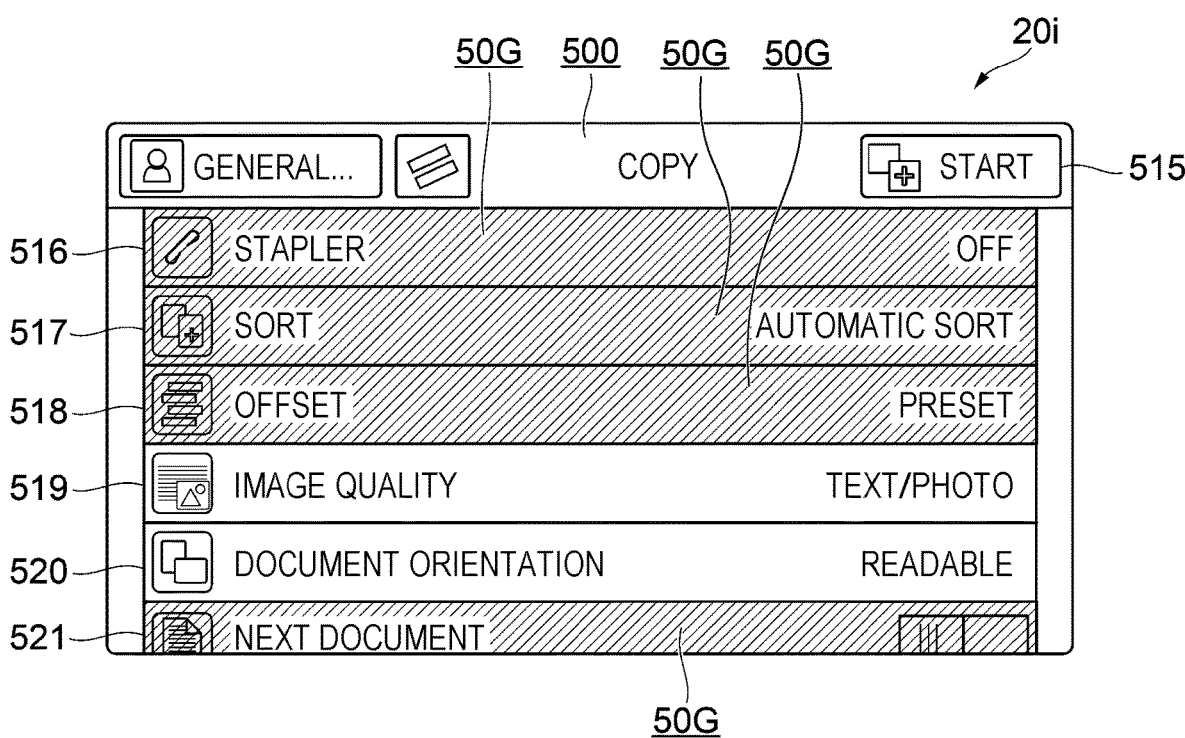

FIGS. 8A and 8B illustrate a third example of the second operation screen 20i of the first exemplary embodiment.

FIG. 8A illustrates the first operation screen 10i. FIG. 8B illustrates the second operation screen 20i.

As illustrated in FIG. 8A, the first operation screen 10i shows various images constituting the operation screen. Specifically, the first operation screen 10i shows a background image 100, a "start" button 115 for instruction to start operation, a "stapler" button 116 for instruction to execute a stapling function, and a "sort" button 117 for instruction to execute a sorting function. The first operation screen 10i also shows an "offset" button 118 for instruction to execute an offsetting function to output a plurality of printed paper bundles with an offset, and an "image quality" button 119 for setting printed image quality. The first operation screen 10i also shows a "document orientation" button 120 for setting an orientation of a document to be read, and a "next document" button 121 for setting the presence or absence of another document to be read. Those images are displayed on the first operation screen 10i in association with the functions executable by the first image forming apparatus 10.

As illustrated in FIG. 8B, the creator 32 creates a second operation screen 20i based on the first operation screen 10i. The second operation screen 20i shows a background image 500 and various images of a "start" button 515, a "stapler" button 516, a "sort" button 517, an "offset" button 518, an "image quality" button 519, a "document orientation" button 520, and a "next document" button 521. Functions of the buttons on the second operation screen 20i correspond to those of the buttons on the first operation screen 10i. Shapes, positions, and colors of the images and text fonts on the second operation screen 20i correspond to those on the first operation screen 10i.

As illustrated in FIG. 8B, the second image forming apparatus 20 displays, in grayout 50G, button images of functions executable by the first image forming apparatus 10 but inexecutable by the second image forming apparatus 20, such as the stapling function, the sorting function, and the offsetting function.

(Specific Processor 33)

The specific processor 33 illustrated in FIG. 4 performs a process related to a function that depends on software executable by the first image forming apparatus 10 and is inexecutable by the second image forming apparatus 20 without the operation screen service of the first exemplary embodiment.

The specific processor 33 performs a process related to a specific function and transmits a result of the process to the second image forming apparatus 20 via the network. Thus, the specific processor 33 performs the process related to the specific function as a substitute for the second image forming apparatus 20. Examples of the specific function include color processing, creation of print data, conversion to a predetermined format such as PDF, and other functions related to image processing.

Figure 9:
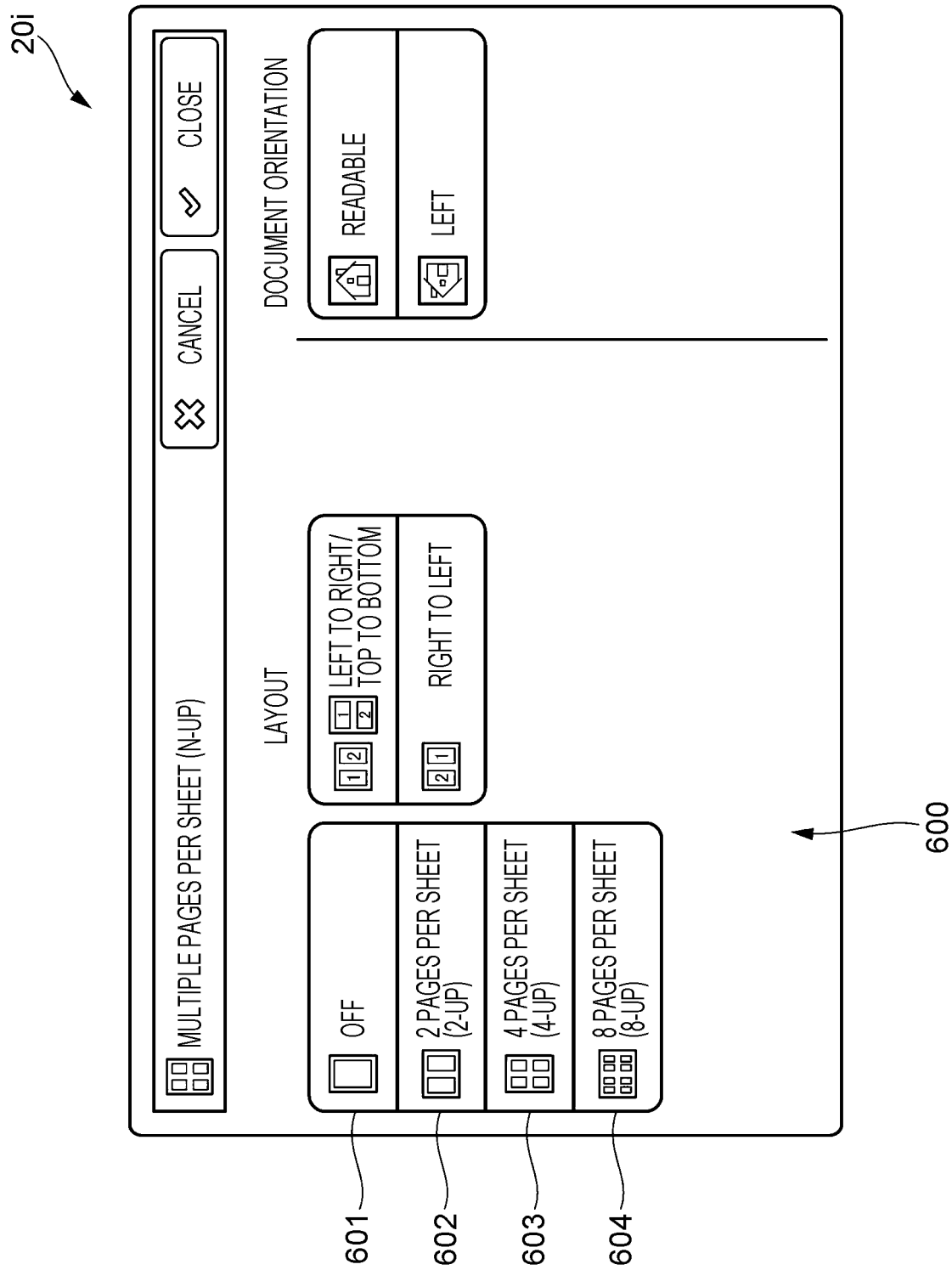
FIG. 9 illustrates a fourth example of the second operation screen of the first exemplary embodiment.

FIG. 9 illustrates a fourth example of the second operation screen 20i of the first exemplary embodiment.

As illustrated in FIG. 9, the second operation screen 20i shows a menu screen 600 related to an N-up printing function for collectively printing a plurality of logical pages in one sheet of paper that is a physical page.

The first image forming apparatus 10 may print images without N-up printing, with two logical pages in one sheet of paper, with four logical pages in one sheet of paper, or with eight logical pages in one sheet of paper.

If the operation screen service of this exemplary embodiment is not used, the second image forming apparatus 20 may print images without N-up printing or with two logical pages in one sheet of paper. This is because the second image forming apparatus 20 does not have software functions that implement printing with four logical pages in one sheet of paper and with eight logical pages in one sheet of paper.

The specific processor 33 may perform, as a substitute for the second image forming apparatus 20, a process for the printing with four logical pages in one sheet of paper and a process for the printing with eight logical pages in one sheet of paper. In response to a user's 4-up or 8-up printing instruction being received by the second image forming apparatus 20, the specific processor 33 acquires print data on a plurality of logical pages to be printed. The specific processor 33 creates image data indicating that the plurality of logical pages are collected in one page, and transmits the image data to the second image forming apparatus 20.

As illustrated in FIG. 9, the menu screen 600 related to the N-up printing function shows an "OFF" button 601 for turning OFF N-up printing, and a "2-up" button 602 for printing images with two logical pages in one sheet of paper. The functions of those buttons are executable by the second image forming apparatus 20 when the operation screen service of this exemplary embodiment is not used. In this case, the menu screen 600 shows, without grayout 50G (see, for example, FIGS. 6A and 6B), a "4-up" button 603 for printing images with four logical pages in one sheet of paper, and an "8-up" button 604 for printing images with eight logical pages in one sheet of paper.

Next, operations of the information processing system 1 according to the first exemplary embodiment are described in detail.

Figure 10:
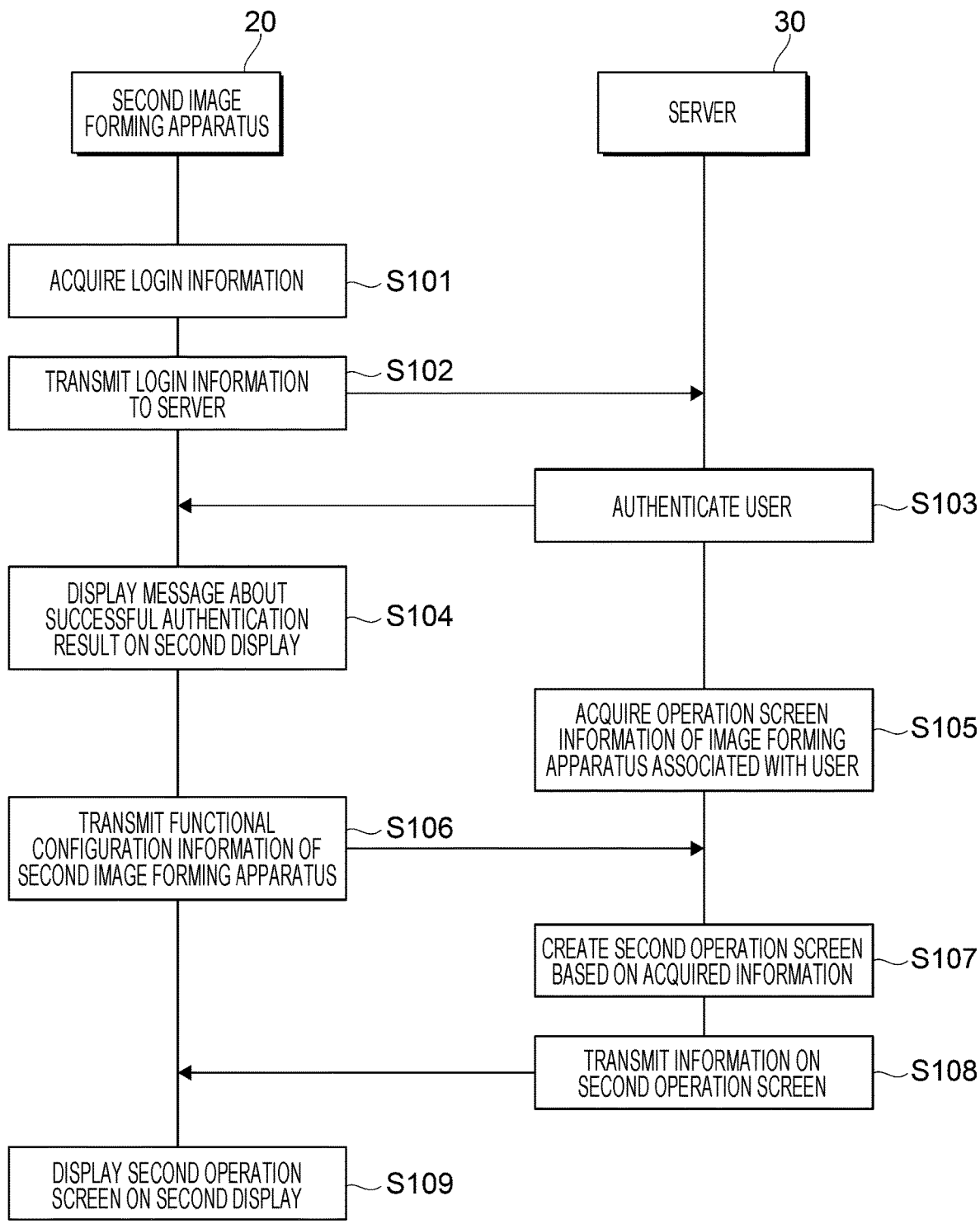
FIG. 10 illustrates operations of the information processing system of the first exemplary embodiment.

FIG. 10 illustrates the operations of the information processing system 1 of the first exemplary embodiment.

As illustrated in FIG. 10, a user logs into, for example, the second image forming apparatus 20 installed in the shop. The second image forming apparatus 20 acquires login information used when the user logged into the second image forming apparatus 20 (S101). The login information includes a user ID and a password of the login user. The second image forming apparatus 20 transmits the login information to the server 30 (S102).

The server 30 authenticates the user based on the received login information (S103). The server 30 determines whether the user ID and the password have a match based on the user management table 300 (see FIG. 5).

In response to acquisition of information indicating that the user has been authenticated successfully from the server 30, the second image forming apparatus 20 causes the second display 21 to display a message about a successful authentication result (S104).

The server 30 acquires operation screen information of an image forming apparatus associated with the login user by referring to the user management table 300 (see FIG. 5) (S105). In the first exemplary embodiment, the server 30 acquires the operation screen information of the first operation screen 10*i* of the first image forming apparatus 10 associated with the login user.

The second image forming apparatus 20 transmits the functional configuration information of the second image forming apparatus 20 to the server 30 (S106). The functional configuration information includes information on hardware functions and software functions of the second image forming apparatus 20 at the time of login.

The server 30 creates a second operation screen 20*i* of the second image forming apparatus 20 based on the acquired operation screen information of the first operation screen 10*i* and in consideration of the functional configuration information of the second image forming apparatus 20 (S107). The server 30 transmits information on the created second operation screen 20*i* to the second image forming apparatus 20 (S108).

The second image forming apparatus 20 causes the second display 21 to display the second operation screen 20*i* based on the information on the second operation screen 20*i* acquired from the server 30 (S109).

The first exemplary embodiment is directed to the example in which the server 30 creates the second operation screen 20*i* of the second image forming apparatus 20, but the first exemplary embodiment is not limited to this example. For example, the second image forming apparatus 20 may acquire the operation screen information of the first operation screen 10*i* of the first image forming apparatus 10 from the server 30, create the second operation screen 20*i* in consideration of the functional configuration information of the second image forming apparatus 20, and cause the second display 21 to display the second operation screen 20*i*.

If no user logs into the second image forming apparatus 20, the operation screen service of this exemplary embodiment is not applied and the second display 21 of the second image forming apparatus 20 displays a second operation screen 20*i* created based on the model of the second image forming apparatus 20.

Second Exemplary Embodiment

Next, an information processing system 1 of a second exemplary embodiment is described. In the second exemplary embodiment, components similar to those in the first exemplary embodiment are represented by the same reference symbols to omit detailed description thereof.

Figure 11:
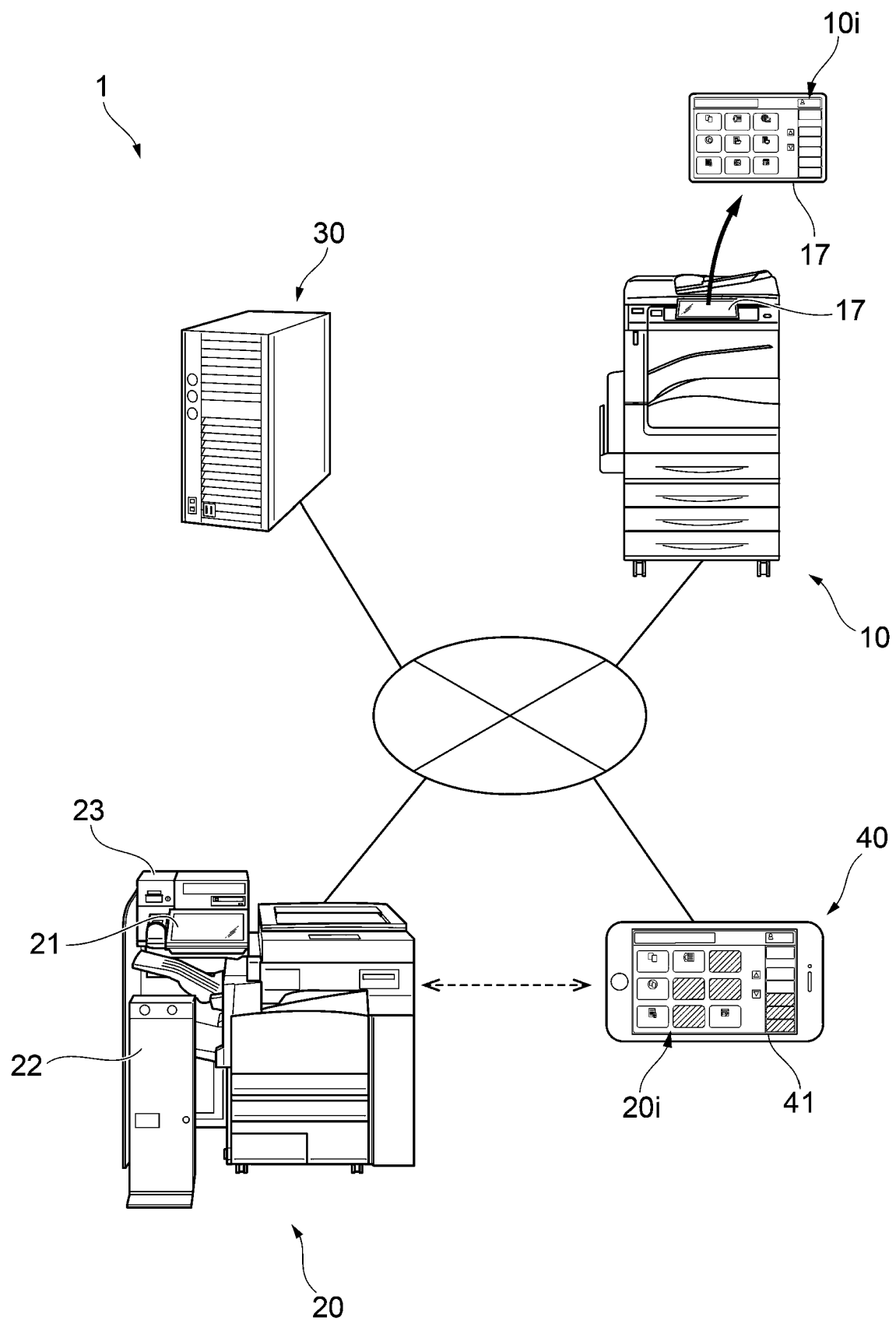
FIG. 11 illustrates an example of the configuration of an information processing system according to a second exemplary embodiment.

FIG. 11 illustrates an example of the configuration of the information processing system 1 according to the second exemplary embodiment.

As illustrated in FIG. 11, the information processing system 1 according to the second exemplary embodiment includes the first image forming apparatus 10, the second image forming apparatus 20, the server 30, and an information terminal 40 to be used by a user.

The information terminal 40 has a third display 41 that displays images. The information terminal 40 may be a mobile phone such as a smartphone, a mobile terminal such as a tablet terminal, or any other terminal carriable by the user. The information terminal 40 communicates with the first image forming apparatus 10, the second image forming apparatus 20, and the server 30 via the network. For example, the information terminal 40 directly communicates with the second image forming apparatus 20 by close-proximity wireless communication.

In the information processing system 1 of the second exemplary embodiment, the server 30 manages screen information related to the first operation screen 10*i* of the first image forming apparatus 10 that the user is familiar with. In the information processing system 1, the user who is going to use, for example, the second image forming apparatus 20 is identified and the third display 41 of the information terminal 40 of the user displays a second operation screen 20*i* created based on the information on the first operation screen 10*i*.

A configuration that implements the operation screen service of the second exemplary embodiment is described below in detail.

The information terminal 40 establishes communicative connection to the second image forming apparatus 20 within a range of close-proximity wireless communication with the second image forming apparatus 20. In the second exemplary embodiment, the user operates the second image forming apparatus 20 via the second operation screen 20*i* displayed on the third display 41 of the information terminal 40.

In this case, the second operation screen 20*i* displayed on the third display 41 of the information terminal 40 is created based on the first operation screen 10*i* of the first image forming apparatus 10 similarly to the first exemplary embodiment. The second operation screen 20*i* is created in consideration of the functional configuration information of the second image forming apparatus 20.

In the second exemplary embodiment, the login user is expected to use the second image forming apparatus 20 via the information terminal 40 at a remote place from the second image forming apparatus 20. In this case, other users may operate the second image forming apparatus 20 considering that the second image forming apparatus 20 is not in use. In the second exemplary embodiment, while the login user is using the second image forming apparatus 20 via the information terminal 40, the use of the second image forming apparatus 20 by a user different from the login user is restricted under a predetermined condition.

Next, operations of the information processing system 1 according to the second exemplary embodiment are described in detail.

Figure 12:
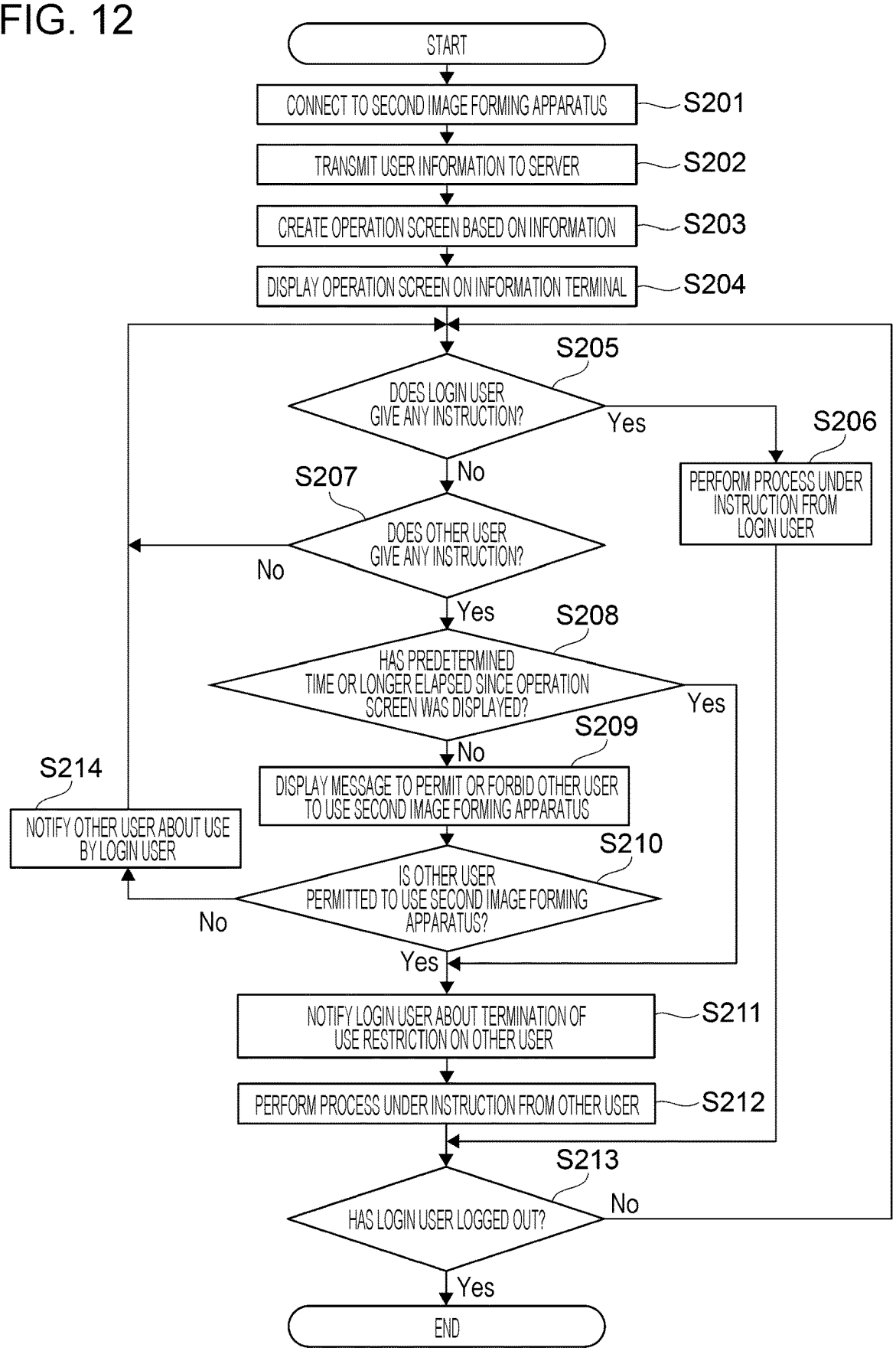
FIG. 12 illustrates operations of the information processing system of the second exemplary embodiment.

FIG. 12 illustrates the operations of the information processing system 1 of the second exemplary embodiment.

In the second exemplary embodiment, the login user operates the second image forming apparatus 20 via the second operation screen 20i displayed on the third display 41 of the information terminal 40. The login user need not stand in front of the second image forming apparatus 20 but may operate the second image forming apparatus 20 at a remote place. In this case, a user different from the login user may use the second image forming apparatus 20 via the second display 21 of the second image forming apparatus 20. The following description is made in consideration of the use of the second image forming apparatus 20 by another user as well.

As illustrated in FIG. 12, the login user establishes connection between the second image forming apparatus 20 and the information terminal 40 (S201). The second image forming apparatus 20 transmits user information acquired from the information terminal 40 to the server 30 (S202). The server 30 creates a second operation screen 20i based on operation screen information associated with the login user and the functional configuration information of the second image forming apparatus 20 (S203). The information terminal 40 causes the third display 41 to display the second operation screen 20i based on information on the second operation screen 20i acquired from the server 30 (S204).

The second image forming apparatus 20 determines whether the login user gives an instruction to perform a process (S205). If the login user gives the instruction ("Yes" in S205), the process is performed under the instruction from the login user (S206).

If the login user does not give the instruction ("No" in S205), the second image forming apparatus 20 determines whether any other user gives an instruction to perform a process (S207). If no other user gives the instruction ("No" in S207), the second image forming apparatus 20 determines, in S205 again, whether the login user gives the instruction. If any other user gives the instruction ("Yes" in S207), the second image forming apparatus 20 determines whether a predetermined time (e.g., 3 minutes) or longer has elapsed since the second operation screen 20i was displayed on the information terminal 40 (S208).

If the predetermined time or longer has not elapsed since the second operation screen 20i was displayed on the information terminal 40 ("No" in S208), the third display 41 of the information terminal 40 displays a message for prompting the login user to decide whether to permit the other user to use the second image forming apparatus 20 (S209). The second image forming apparatus 20 determines whether the login user has permitted the other user to use the second image forming apparatus 20 (S210).

If the login user has permitted the other user to use the second image forming apparatus 20 ("Yes" in S210) or if the predetermined time or longer has elapsed since the second operation screen 20i was displayed on the information terminal 40 ("Yes" in S208), the third display 41 of the information terminal 40 displays a notification about termination of use restriction on the other user (S211). The second image forming apparatus 20 performs the process under the instruction from the other user (S212).

If the process is performed under the instruction from the other user in S212 or if the process is performed under the instruction from the login user in S206, the second image forming apparatus 20 determines whether the login user has logged out of the second image forming apparatus 20 via the information terminal 40 (S213).

If the login user has not logged out of the second image forming apparatus 20 ("No" in S213), the second image forming apparatus 20 determines, in S205 again, whether the login user gives the instruction. If the login user has logged out of the second image forming apparatus 20 ("Yes" in S213), the series of processes is terminated.

If the login user has not permitted the other user to use the second image forming apparatus 20 ("No" in S210), that is, if the login user intends to restrict the use of the second image forming apparatus 20 by the other user, the second display 21 displays a notification about the current use of the second image forming apparatus 20 by the login user (S214). Then, the second image forming apparatus 20 determines, in S205 again, whether the login user gives the instruction.

Third Exemplary Embodiment

Next, an information processing system 1 of a third exemplary embodiment is described. In the third exemplary embodiment, components similar to those in the other exemplary embodiments are represented by the same reference symbols to omit detailed description thereof.

In the information processing system 1 of the third exemplary embodiment, an operation screen of an image forming apparatus may be customized, for example, via the information terminal 40 to meet user's preferences. The customization of the operation screen means that the user arbitrarily edits the contents of the operation screen, such as the types or positions of the button images to be displayed on the operation screen.

In the information processing system 1 of the third exemplary embodiment, the server 30 manages screen information including information on the first operation screen 10i of the first image forming apparatus 10 that the user is familiar with, customization information of the first operation screen 10i, and customization information of the second operation screen 20i of the second image forming apparatus 20. In the information processing system 1, the user who is going to use, for example, the second image forming apparatus 20 is identified and the second display 21 of the second image forming apparatus 20 or the third display 41 of the information terminal 40 displays a customized first operation screen 10i or a customized second operation screen 20i.

A configuration that implements the operation screen service of the third exemplary embodiment is described below in detail.

In the information processing system 1 of the third exemplary embodiment, the server 30 manages settings on the operation screen customized by the user via the information terminal 40. For example, the server 30 stores information on the customization of the first operation screen 10i of the first image forming apparatus 10 or the second operation screen 20i of the second image forming apparatus 20 via the information terminal 40.

Next, description is made about an example of the customization of the second operation screen 20i based on the first operation screen 10i of the first image forming apparatus 10 in the shop where the second image forming apparatus 20 is installed.

Figure 13:
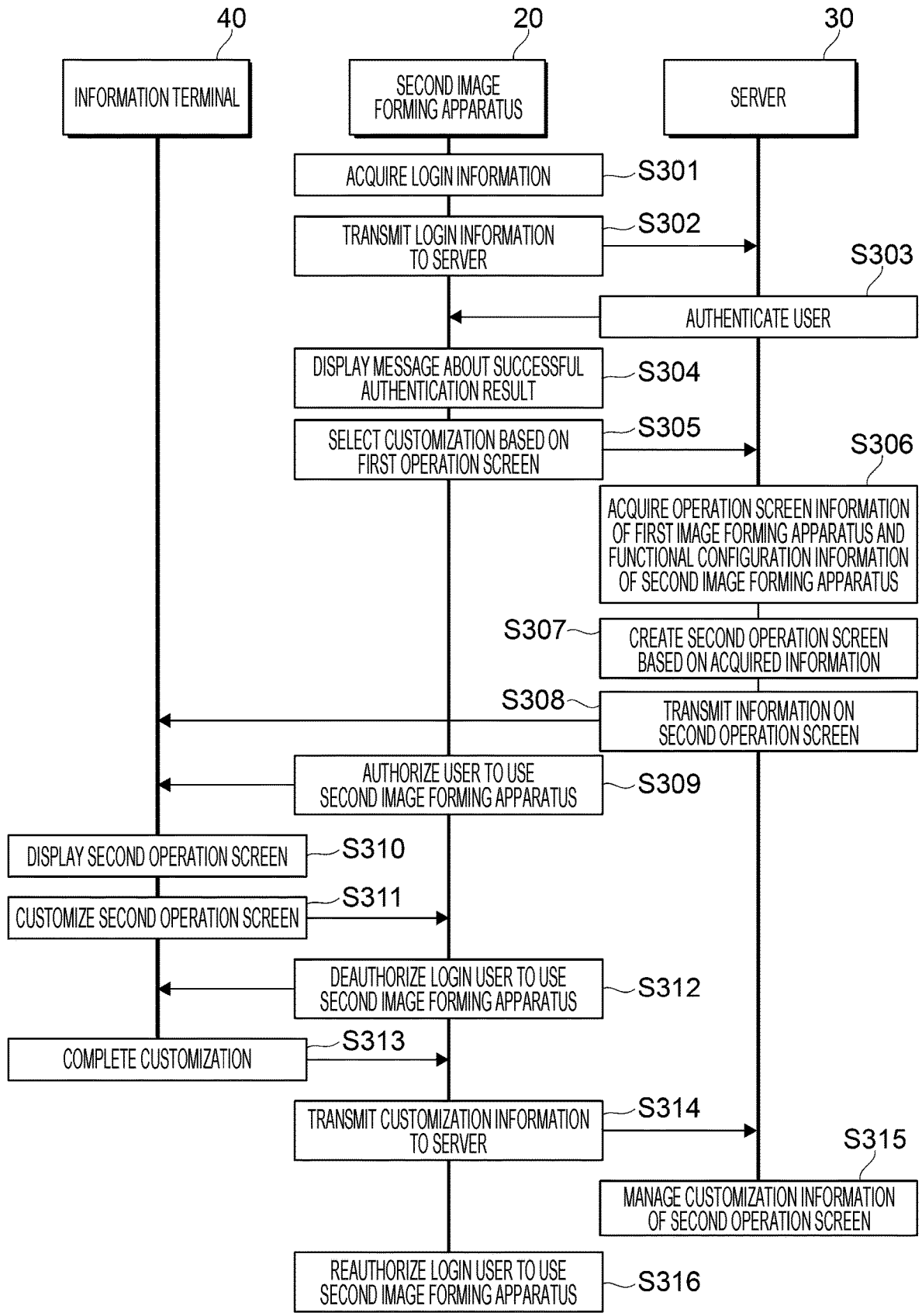
FIG. 13 illustrates operations for customizing a second operation screen based on a first operation screen of a first image forming apparatus according to a third exemplary embodiment.

FIG. 13 illustrates operations for customizing the second operation screen 20i based on the first operation screen 10i of the first image forming apparatus 10 according to the third exemplary embodiment.

As illustrated in FIG. 13, S301 to S304 are similar to S101 to S104 described in the first exemplary embodiment. After S304, the user selects customization based on the first operation screen 10*i* via the second image forming apparatus 20 (S305).

The server 30 acquires the operation screen information of the first operation screen 10*i* of the first image forming apparatus 10 associated with the login user and the functional configuration information of the second image forming apparatus 20 (S306). The server 30 creates a second operation screen 20*i* based on the acquired pieces of information (S307) and transmits information on the created second operation screen 20*i* to the information terminal 40 via the second image forming apparatus 20 (S308).

In S307 and S308, for example, the second image forming apparatus 20 may acquire the operation screen information of the first operation screen 10*i* of the first image forming apparatus 10 and cause the second display 21 to display the second operation screen 20*i* created in consideration of the functional configuration information of the second image forming apparatus 20.

The second image forming apparatus 20 authorizes the login user to use the second image forming apparatus 20 with priority (S309).

The information terminal 40 causes the third display 41 to display the received second operation screen 20*i* (S310). The information terminal 40 receives a user's operation for customizing the second operation screen 20*i* (S311). For example, if the login user is using the second image forming apparatus 20 for a predetermined time or longer, the second image forming apparatus 20 deauthorizes the login user to use the second image forming apparatus 20 (S312).

In response to completion of the customization by the login user (S313), the second image forming apparatus 20 transmits customization information of the second operation screen 20*i* to the server 30 (S314). The server 30 manages the customization information of the second operation screen 20*i* in association with the login user (S315).

The second image forming apparatus 20 reauthorizes the login user to use the second image forming apparatus 20 (S316). The user is permitted to perform various processes by using the second image forming apparatus 20. At this time, the second display 21 of the second image forming apparatus 20 displays the second operation screen 20*i* customized by the user.

Next, description is made about another example of the customization of the second operation screen 20*i* of the second image forming apparatus 20 in the shop where the second image forming apparatus 20 is installed. Unlike the first exemplary embodiment, the second operation screen 20*i* of the second image forming apparatus 20 is not based on the first operation screen 10*i*.

FIG. 14 illustrates operations for customizing the second operation screen 20*i* of the second image forming apparatus 20 according to the third exemplary embodiment.

As illustrated in FIG. 14, S401 to S404 are similar to S101 to S104 described in the first exemplary embodiment. After S404, the user selects customization of the second operation screen 20*i* of the second image forming apparatus 20 (S405).

If the user customized the second operation screen 20*i* in the past, the server 30 acquires previous customization information of the second operation screen 20*i* (S406). The server 30 transmits the customization information of the second operation screen 20*i* to the second image forming apparatus 20 (S407).

The second image forming apparatus 20 authorizes the login user to use the second image forming apparatus 20 with priority (S408). The second image forming apparatus 20 creates a second operation screen 20*i* based on the previous customization information (S409) and transmits information on the created second operation screen 20*i* to the information terminal 40.

The information terminal 40 causes the third display 41 to display the second operation screen 20*i* received from the second image forming apparatus 20 (S410). The information terminal 40 receives a user's operation for customizing the second operation screen 20*i* (S411). For example, if the login user is using the second image forming apparatus 20 for a predetermined time or longer, the second image forming apparatus 20 deauthorizes the login user to use the second image forming apparatus 20 (S412).

In response to completion of the customization by the login user (S413), the second image forming apparatus 20 transmits customization information of the second operation screen 20*i* to the server 30 (S414). The server 30 manages the customization information of the second operation screen 20*i* of the second image forming apparatus 20 in association with the user (S415).

The second image forming apparatus 20 reauthorizes the login user to use the second image forming apparatus 20 (S416). Then, the user may perform various processes by using the second image forming apparatus 20. At this time, the second display 21 of the second image forming apparatus 20 displays the second operation screen 20*i* customized by the user.

The first exemplary embodiment to the third exemplary embodiment are described taking the example in which the first image forming apparatus 10 is installed in the company and the second image forming apparatus 20 is installed in the shop. The exemplary embodiments are not limited to this case. For example, the first exemplary embodiment to the third exemplary embodiment may be applied to a case where a plurality of image forming apparatuses different in terms of models are installed in a company or the like.

When the user uses the first image forming apparatus 10, the first display 17 may display an operation screen created based on the second operation screen 20*i*. For example, if the user is familiar with the second operation screen 20*i* of the second image forming apparatus 20 installed in the shop, the contents of the second operation screen 20*i* may be managed in association with the user and the first operation screen 10*i* may be displayed based on the second operation screen 20*i* when the user uses the first image forming apparatus 10.

In the first exemplary embodiment to the third exemplary embodiment, the image forming apparatus that is a so-called multifunction peripheral having a scanning function, a printing function, a copying function, and a facsimile function is used as an example of the image processing apparatus, but the image processing apparatus is not limited to this example. The image processing apparatus may be any apparatus that processes images. Examples of the image processing apparatus include a printer that has a printing function but does not have other functions, and a scanner that has a scanning function but does not have other functions.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a processor configured to:
   manage pieces of screen information in association with users, the screen information to be used for creating an operation screen of a first image processing apparatus;
   manage screen information of an operation screen of a second image processing apparatus used by the user in a past, wherein the first image processing apparatus and the second image processing apparatus are different image processing apparatuses;
   identify a user who is going to use the first image processing apparatus;
   create the operation screen of the first image processing apparatus based on the screen information of the operation screen of the second image processing apparatus and based on the identified user, such that the created operation screen of the first image processing apparatus has a matching screen design with respect to text fonts, positions of button images, and colors of the button images on the operation screen of the second image processing apparatus; and
   cause a display to display the created operation screen of the first image processing apparatus, the display being used by the user when using the first image processing apparatus.

2. The information processing apparatus according to claim 1, wherein the processor is configured to acquire functional information related to a function executable by the first image processing apparatus that is being used by the user.

3. The information processing apparatus according to claim 2, wherein the processor is configured to acquire the functional information from the first image processing apparatus that is being used by the user.

4. The information processing apparatus according to claim 2, wherein the processor is configured to
   cause the operation screen on the display to show a function executable by the second image processing apparatus and inexecutable by the first image processing apparatus that is being used by the user in a format different from a format on the operation screen of the second image processing apparatus.

5. The information processing apparatus according to claim 4, wherein the processor is configured to
   execute a specific function that is executable by the second image processing apparatus and is not supported by the first image processing apparatus that is being used by the user; and
   cause the operation screen on the display to show the specific function in a format indicating that the specific function is available.

6. The information processing apparatus according to claim 4, wherein the processor is configured to
   cause the operation screen on the display to show a function inexecutable by the second image processing apparatus and executable by the first image processing apparatus that is being used by the user in the format on the operation screen of the second image processing apparatus.

7. The information processing apparatus according to claim 1, wherein the processor is configured to
   manage information about an edit of the operation screen made by the user via an information terminal.

8. The information processing apparatus according to claim 7, wherein the processor is configured to
   transmit, to the information terminal, screen information of the operation screen of the second image processing apparatus used by the user in the past; and
   receive an edit of the operation screen of the first image processing apparatus made by the user.

9. A non-transitory computer readable medium storing a program causing a computer to execute a process comprising:
   managing pieces of screen information in association with users, the screen information to be used for creating an operation screen of a first image processing apparatus;
   manage screen information of an operation screen of a second image processing apparatus used by the user in a past, wherein the first image processing apparatus and the second image processing apparatus are different image processing apparatuses;
   identifying a user who is going to use the image processing apparatus;
   creating the operation screen of the first image processing apparatus based on the screen information of the operation screen of the second image processing apparatus and based on the identified user, such that the created operation screen of the first image processing apparatus has a matching screen design with respect to text fonts, positions of button images, and colors of the button images on the operation screen of the second image processing apparatus; and
   causing a display to display the created operation screen of the first image processing apparatus, the display being used by the user when using the image processing apparatus.

10. A non-transitory computer readable medium storing a program causing a computer to execute a process comprising:
    identifying a user who is going to use a first apparatus;
    creating an operation screen of the first apparatus based on screen information of an operation screen of a second apparatus that is managed in association with the user based on past use by the user, such that the created operation screen of the first apparatus has a matching screen design with respect to text fonts, positions of button images, and colors of the button images on the operation screen of the second apparatus; and
    causing a display to display the created operation screen of the first apparatus, the display being used by the user when using the first apparatus,
    wherein the first apparatus and the second apparatus are separate apparatuses.

11. The information processing apparatus according to claim 1, wherein the first image forming apparatus comprises a multifunction device comprising at least one of a scanner, copier, fax machine or printer.

12. The information processing apparatus according to claim 1, wherein the operation screen of the first image forming apparatus is configured to control operations of the first image forming apparatus and the operation screen of the second image forming apparatus is configured to control operations of the second image forming apparatus.

13. The information processing apparatus according to claim 1, wherein the operation screen of the second image processing apparatus includes at least a plurality of button images representing a plurality of functions executable by the second image processing apparatus, and the created operation screen of the first image processing apparatus has a matching screen design with the operation screen of the second image processing apparatus and includes all of the plurality of buttons in the operation screen of the second image processing apparatus.

\* \* \* \* \*